United States Patent
Yuzawa

(10) Patent No.: US 6,719,594 B1
(45) Date of Patent: Apr. 13, 2004

(54) BOARD-MOUNTED CONNECTOR

(75) Inventor: Fumio Yuzawa, Nagano (JP)

(73) Assignee: Tyco Electronics. AMP, K.K., Kanagawa (JP)

( * ) Notice: Subject to any disclaimer, the term of this patent is extended or adjusted under 35 U.S.C. 154(b) by 0 days.

(21) Appl. No.: 09/914,970

(22) PCT Filed: Mar. 2, 2000

(86) PCT No.: PCT/IB00/00427

§ 371 (c)(1),
(2), (4) Date: Feb. 8, 2002

(87) PCT Pub. No.: WO00/54372

PCT Pub. Date: Sep. 14, 2000

(30) Foreign Application Priority Data

Mar. 8, 1999 (JP) ............................... 11-060479

(51) Int. Cl.⁷ ................................................ H01R 4/48
(52) U.S. Cl. .......................... 439/862; 439/66; 439/660; 439/736
(58) Field of Search .................... 439/66, 862, 65, 439/74, 660, 720, 733.1, 736

(56) References Cited

U.S. PATENT DOCUMENTS

| | | | |
|---|---|---|---|
| 3,993,384 A | | 11/1976 | Dennis et al. .......... 339/17 CF |
| 4,085,998 A | * | 4/1978 | Owens ...................... 339/28 |
| 4,087,151 A | * | 5/1978 | Robert et al. ............... 439/188 |
| 4,623,207 A | * | 11/1986 | Sasaki et al. .................. 339/17 |
| 5,655,913 A | * | 8/1997 | Castaneda et al. ............ 439/66 |
| 6,000,969 A | * | 12/1999 | Reichardt et al. ........... 439/630 |
| 6,089,876 A | * | 7/2000 | Kuwahara et al. ............. 439/67 |
| 6,142,790 A | * | 11/2000 | Niitsu .......................... 439/66 |
| 6,273,731 B1 | * | 8/2001 | Bishop et al. ................. 439/66 |
| 6,287,151 B1 | * | 9/2001 | Matsuzaki et al. .......... 439/630 |
| 6,293,805 B1 | * | 9/2001 | Wu .............................. 439/66 |
| 6,305,948 B1 | * | 10/2001 | Wu .............................. 439/66 |
| 6,312,263 B1 | * | 11/2001 | Higuchi et al. ............... 439/66 |
| 6,398,598 B2 | * | 6/2002 | Masumoto .................. 439/862 |

FOREIGN PATENT DOCUMENTS

| | | | |
|---|---|---|---|
| EP | 0 561 312 A1 | 9/1993 | ............ H01R/0/09 |
| JP | 6-68941 | 6/1994 | ............ H01R/23/68 |
| JP | 0 81 62 227 | 6/1996 | ............ H01R/23/02 |

OTHER PUBLICATIONS

See PCT International Search Report for any references that are not enclosed herewith.

* cited by examiner

Primary Examiner—P. Austin Bradley
Assistant Examiner—Edwin A. León

(57) ABSTRACT

A board-mountable electrical connector (10, 110) comprises a housing (20, 120) which holds a plurality of contacts (30, 120) in a row. Each of the contacts includes a supporting part (31, 131) that is secured to the housing, a connecting part (33, 133) disposed at one end of the supporting part for connection with a circuit board, and a contact part (32, 132) disposed at an opposite end of the supporting part for electrical contact with a mating body. The contact part extends from the supporting part with successive portions including, first, a downward-facing projection (51) adjacent to the supporting part, a projecting shape (56) extending upward to an apex (56a) and then downward to a bent part (52) at a forward end of the contact part, and an arm part (53) extending upwardly and rearwardly from the bent part to a pair of contact projections (54) which can make electrical connection with the mating body. The contact projections (54) are disposed rearwardly of the apex (56a) of the projecting shape.

3 Claims, 7 Drawing Sheets

BOARD-MOUNTED CONNECTOR

BACKGROUND OF THE INVENTION

1. Field of the Invention

The invention relates to an electrical connector that can be mounted on a circuit board for making mutual electrical connections with another circuit board, card or electronic device, etc., that is disposed on a top side of the electrical connector.

2. Summary of the Prior Art

Examples of connectors of this type are disclosed in Japanese Patent Application Kokai No. HEI 6-68941 and Japanese Patent Application Kokai No. HEI 8-162227. The board-mounted connector includes a housing and a plurality of contacts carried by the housing. Each of the contacts has a part that is supported in the housing, a connecting part that extends on one side of the supported part for surface-mount attachment to a circuit board, and a contact part which is used to make electrical contact with a mating body such as a card or other connector device. The contact part includes a portion that provides an elastic force in order to make elastic contact with the mating body placed on the top side of the connector.

In recent years, smaller size and lower height have been required in connectors of this type. Although the connectors disclosed in the above-mentioned patents have shapes that satisfy these requirements to some extent, it is difficult to obtain a sufficient spring elastic force in the contact parts of the contacts. Therefore, requirements for a further reduction in size and in height (an engaged height of 1 mm or less, e.g., approximately 0.8 mm) cannot be met. Thus, a problem to be solved is how to provide a board-mountable connector that can provide a sufficient elastic force while achieving a small size and a low height.

SUMMARY OF THE INVENTION

This problem is solved by a board-mountable electrical connector according to claim 1.

The invention is a board-mountable electrical connector comprising a housing which holds a plurality of contacts in a row. Each of the contacts includes a supporting part that is secured to the housing, a connecting part disposed at one end of the supporting part for connection with a circuit board, and a contact part disposed at an opposite end of the supporting part for electrical contact with a mating body. The contact part extends from the supporting part with successive portions including, first, a downward-facing projection adjacent to the supporting part, a projecting shape extending upward to an apex and then downward to a bent part at a forward end of the contact part, and an arm part extending upwardly and rearwardly from the bent part to a pair of contact projections which can make electrical connection with the mating body. The contact projections are disposed rearwardly of the apex of the projecting shape.

BRIEF DESCRIPTION OF THE DRAWING

FIG. 1(*b*) is a bottom view of the connector;

FIG. 1(*c*) is a side view of the connector;

FIG. 3(*b*) is a side view of the contacts;

DETAILED DESCRIPTION OF THE PREFERRED EMBODIMENT

Figure 1A:
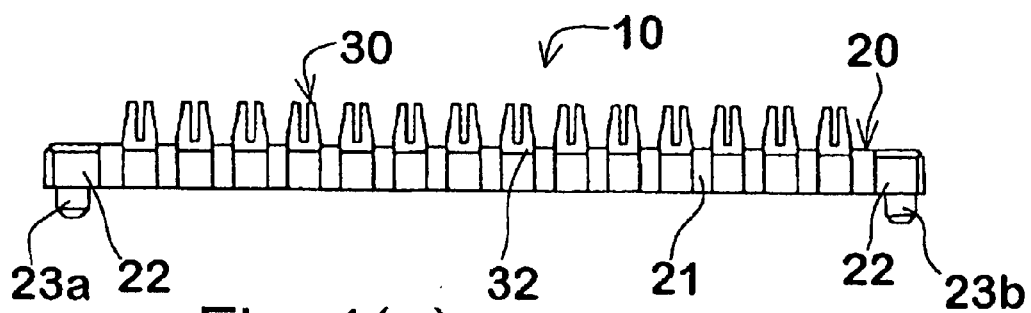
FIG. 1(*a*) is a front view of an electrical connector according to the invention.
Figure 1B:
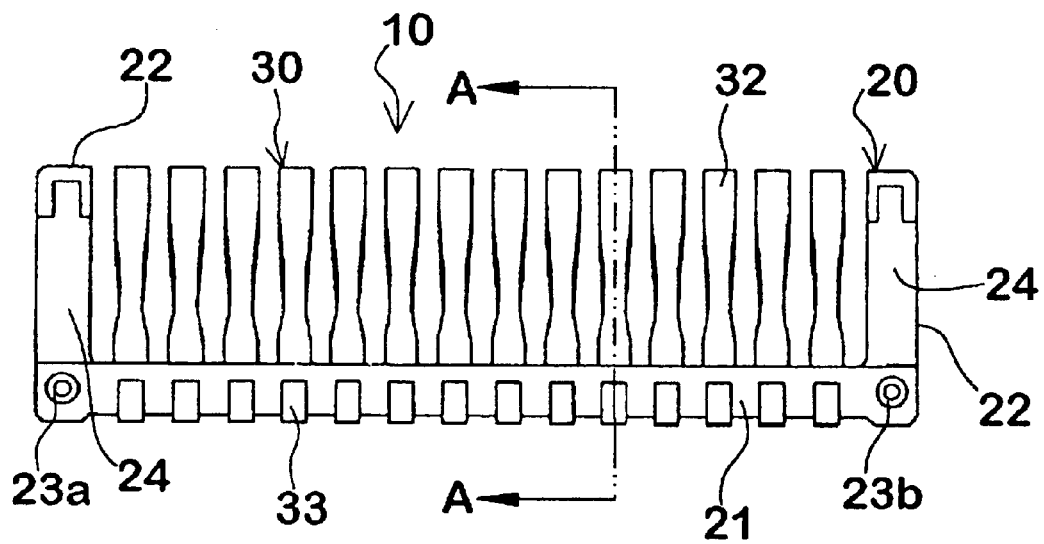
Figure 1C:
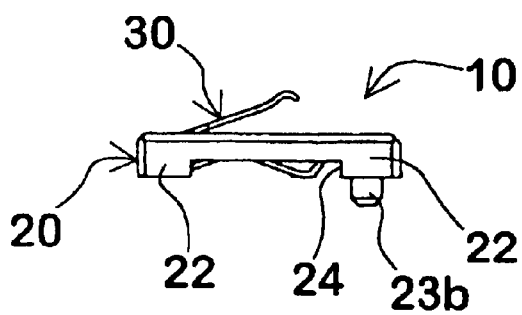

As shown in FIGS. 1(*a*)–(*c*), a board-mountable connector 10 includes an insulating housing 20 and a plurality of contacts 30 that are supported in the housing and arranged in a row. As viewed from the bottom in FIG. 1(*b*), the housing 20 is substantially C-shaped, having a main part 21 that extends parallel to the row of contacts 30, and end walls 22 that extend in a common direction from both ends of the main part 21. The end walls 22 are positioned to flank the row of contacts 30 at respective opposite ends thereof. Recesses 24 are formed in intermediate positions in the bottom surfaces of the end walls 22. The contacts 30 are supported and held to the housing 20 by being insert-molded in the main part 21. Positioning posts 23*a* and 23*b* which are used to position the board-mountable connector 10 on a circuit board (not shown) are disposed at both ends of the bottom surface of the main part 21.

Figure 2:
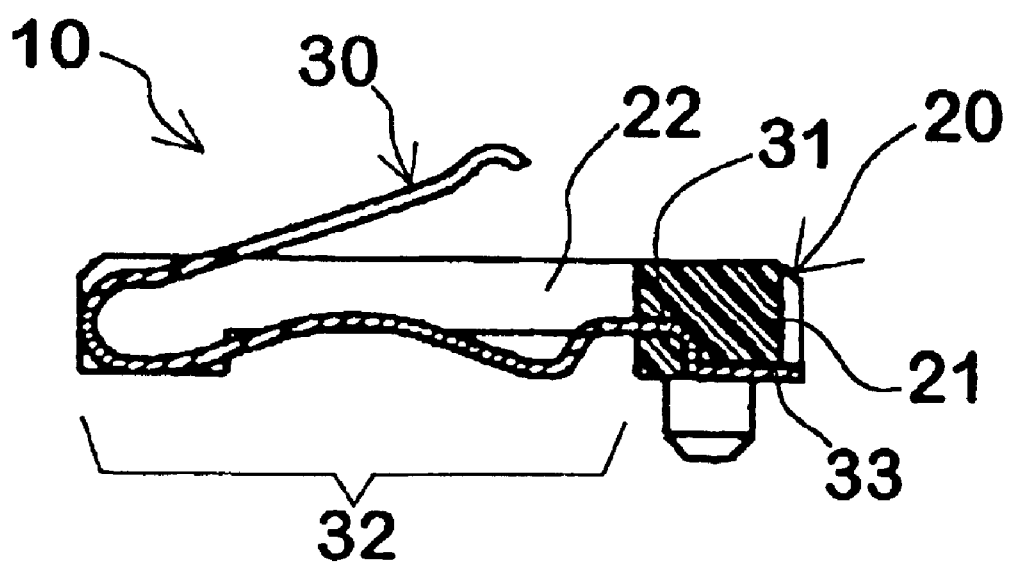
FIG. 2 is a cross-sectional view along line A—A in FIG. 1(*b*).

With reference to FIG. 2, the contact 30 has a substantially L-shaped supporting part 31 which is positioned inside the main part 21, a contact part 32 which extends forward from the supporting part 31, and a surface mounting type connecting part 33 which extends rearward along the bottom surface of the main part 21. The contact part 32 extends outward from the main part 21 at an intermediate level with respect to the height of the main part 21. The contact 32 has a special shape which will be described in more detail hereinbelow.

As shown in the Figures, the end walls 22 of the housing 20 have a length that substantially coincides with the length of the contact parts 32, and the end walls 22 act to protect the contact parts 32 until the board-mountable connector 10 is mounted on the circuit board. Furthermore, after the board-mountable connector has been mounted on the circuit board, the end walls 22 act to maintain the attitude of the housing 20 by contacting the circuit board near the tip end.

Figure 3A:
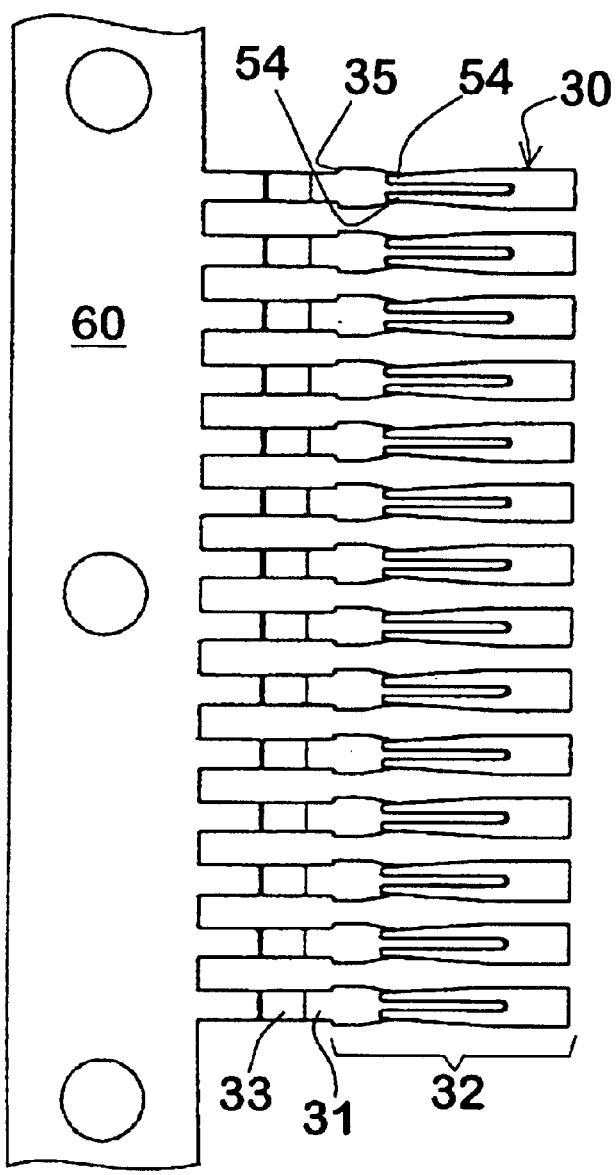
FIG. 3(*a*) is a top view of contacts that can be used in the connector, the contacts being shown attached to a carrier strip prior to insertion in the connector.
Figure 3B:
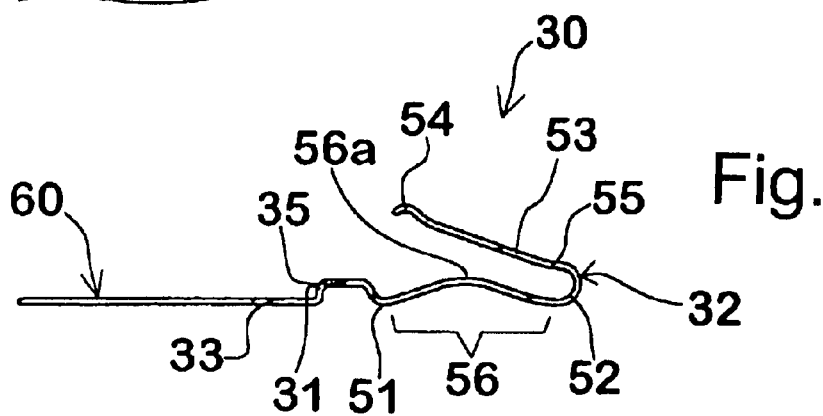

As shown in FIGS. 3(*a*) and 3(*b*), the contacts 30 are formed on a carrier strip 60 and are spaced from each other by a constant pitch. The contacts 30 are insert-molded in the housing 20 of the connector 10. The contacts 30 have shoulders 35 along both side edges in boundary positions between the supporting parts 31 and the contact parts 32. The shoulders 35 are disposed so that they substantially contact the outer surface of the housing 20 when the housing is formed by insert-molding; these shoulders 35 further stabilize the support of the contacts 30, and act to maintain the contacts 30 in accurate positions.

Each contact part 32 extends from the supporting part 31 and has successive portions including, first, a downward-facing projection 51 that extends downward from the supporting part 31, a projecting shape that extends upward from the downward-facing projection 51 to an apex 56a and then downward to a bent part 52 at a forward end of the contact part 32. From the bent part 52, the contact part 32 continues along an arm part 53 that extends rearward and upward at an inclination from the bent part 52. Contact projections 54, which are adapted to contact a mating body such as a circuit card or other electrical device, are formed near the tip or free end of the arm part 53. The arm part 53 has a shape that rises relatively steeply from the bent part 52. The arm part 53 is demarcated by a part 55 of varying curvature adjacent to the bent part 52.

The tip or free end of the arm part 53 has a forked shape; accordingly, two contact projections 54 are formed for each contact 30. The contact projections 54 are disposed rearwardly of the apex 56a of the projecting shape 56 that is demarcated by the downward-facing projection 51 and the bent part 52, and the contact portions 54 are disposed slightly forward of the downward-facing projection 51.

Figure 4:
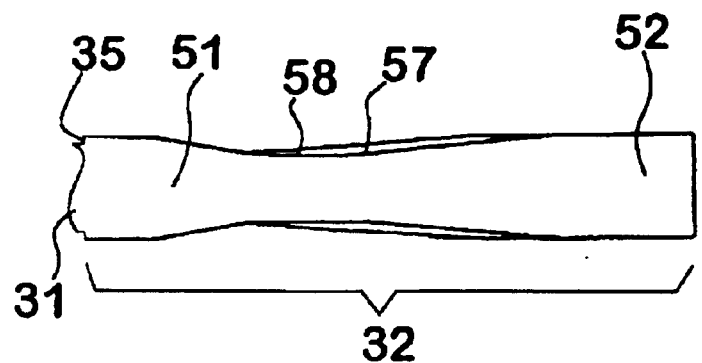
FIG. 4 is a bottom view of a contact part of one of the contacts.
Figure 5:
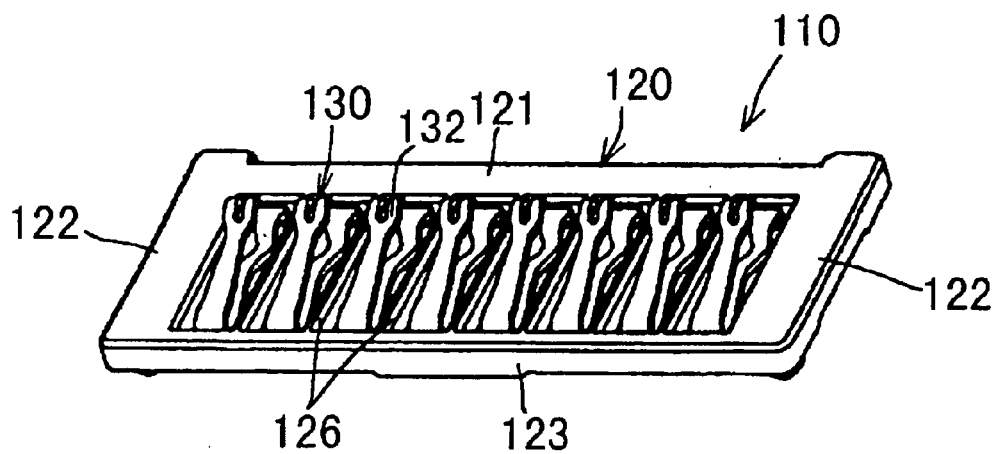
FIG. 5 is a perspective view of a board-mounted connector in an alternate embodiment according to the invention.
Figure 6:
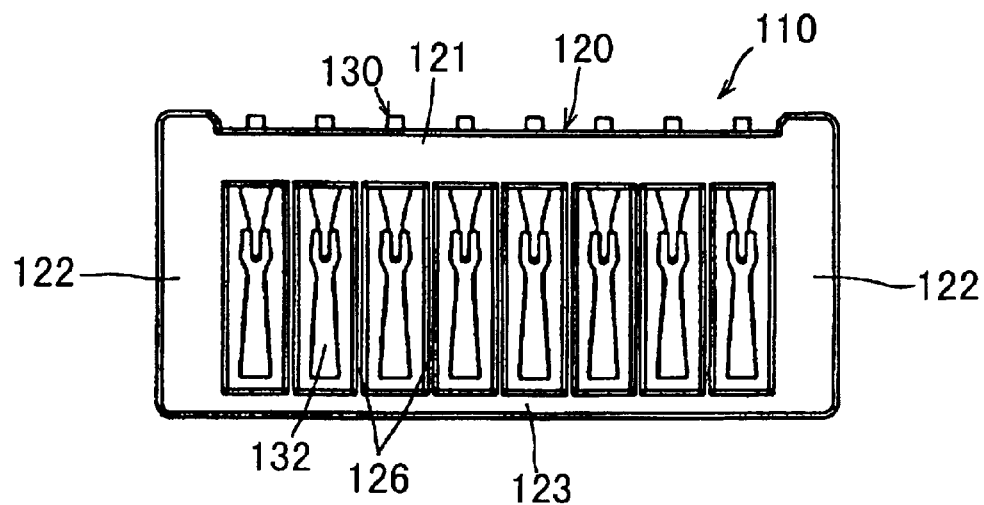
FIG. 6 is a top plan view of the board-mounted connector shown in FIG. 5.
Figure 7:
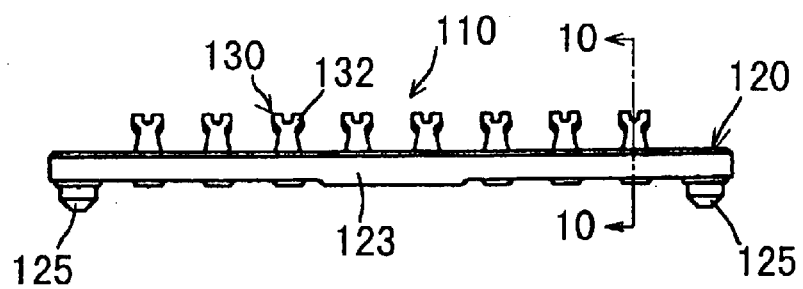
FIG. 7 is a front view of the board-mounted connector shown in FIG. 5.
Figure 8:
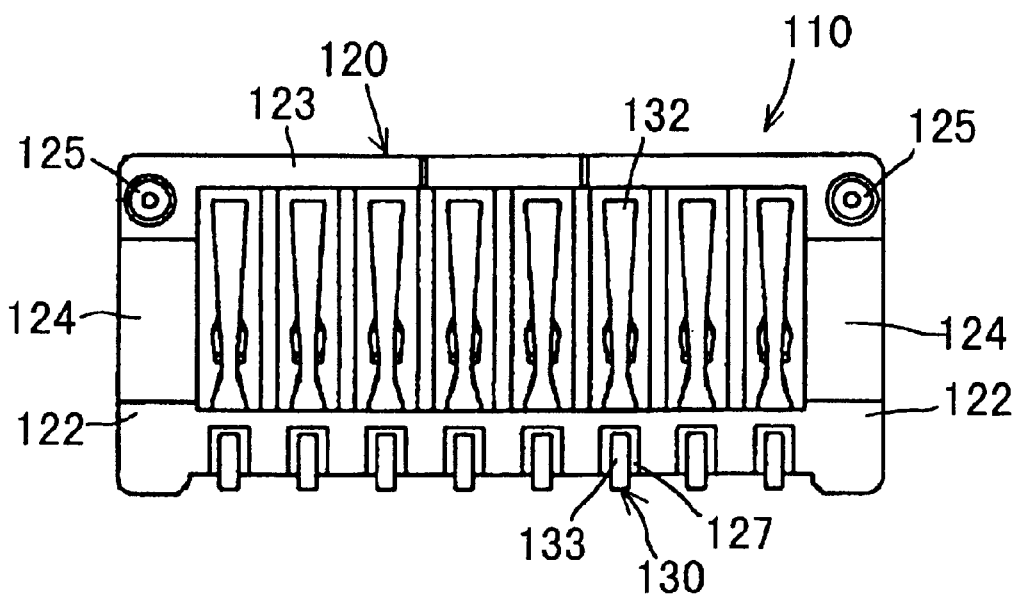
FIG. 8 is a bottom view of the board-mounted connector shown in FIG. 5.
Figure 9:
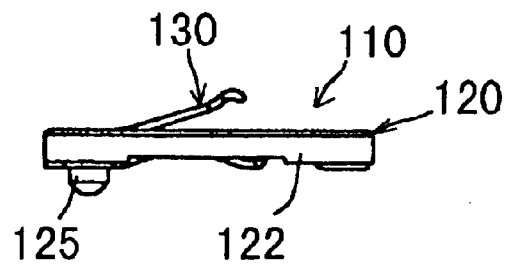
FIG. 9 is a right-side view of the board-mounted connector shown in FIG. 5.
Figure 10:
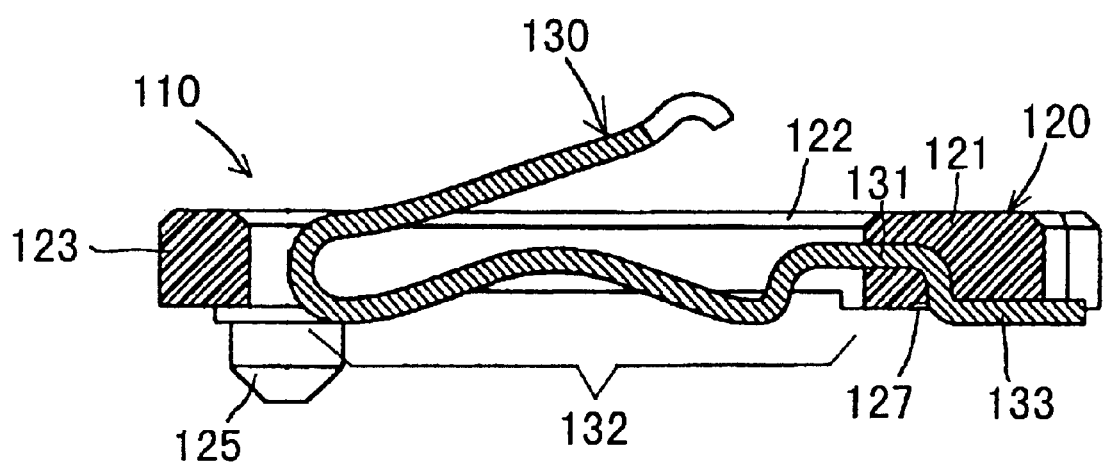
FIG. 10 is an enlarged cross-sectional view taken along line 10—10 in FIG. 7.

Furthermore, as is shown in FIG. 4, a neck part 57 is formed in a portion of the contact part 32 that includes the downward-facing projection 51 between the supporting part 31 and the bent part 52. A narrowest part 58 of the neck part 57 is positioned slightly forward of the downward-facing projection 51.

The contact parts 32 of the contacts 30 are able to provide a sufficient elastic force for establishing stable connections with the mating body, in spite of the fact that the space occupied by the contact parts 32 is relatively small. The driving force that presses the contact projections 54 against a mating body that is placed on the top surface of the connector 10 is provided by a spring elastic force that is obtained from more or less the entire body of each contact part 32 with the characteristic shape described above. In particular, it should be noted that when the mating body is placed in position, a force in the pivoting direction that causes the bent part 52 to move slightly upward acts on each contact part 32 in addition to the ordinary spring repulsion force. Accordingly, the connector 10 can provide highly reliable electrical connections while minimizing the mounting area and providing a relatively low height.

Another embodiment of a board-mountable connector according to the invention will be described with reference to FIGS. 5 through 10. Board-mountable connector 110, like the board-mountable connector 10 shown in FIGS. 1 through 4, has an insulating housing 120 and a plurality of contacts 130 supported in the housing.

Here, the contacts 130 have the same construction as the contacts 30 of the board-mountable connector 10 shown in FIGS. 1 through 4. Each contact 130 has a substantially L-shaped supporting part 131 which is positioned inside the main part 121 of the housing 120, a contact part 132 which extends forward from the supporting part 131, and which extends outward at an intermediate level with respect to the height of the main part 121 of the housing 120, and a surface mounting type connecting part 133 which extends rearward along the bottom surface of the main part 121. Since the contacts 130 have the same construction as the contacts 30, and since the constructions and actions of the supporting parts 131, contact parts 132 and connecting parts 133 are the same as the constructions and actions of the supporting parts 31, contact parts 32 and connecting parts 33, a description of these parts is omitted here.

The housing 120 is formed by molding an insulating resin, and extends parallel to the row of contacts 130 like the housing 20 shown in FIGS. 1–4. This housing 120 has a main part 121 which supports the supporting parts 131 of the contacts 130, and a pair of end walls 122 which extend from both ends of the main part 121 parallel to the contact parts 132 at opposite ends of the row of contacts 130, and thus protect the contact parts 132. However, unlike the housing 20, the housing 120 also has a linking part 123 which links the pair of end walls 122, thereby surrounding the contact parts 132 along with the main part 121 and the end walls 122. Since this linking part 123 is present, protection of the contact parts 132 is enhanced, and the strength of the housing 120 itself is improved.

The housing 120 also includes a plurality of partition walls 126 that are disposed between contact parts 132 of adjacent contacts 130. The partition walls 126 prevent interference or contact between the contact parts 132 of adjacent contacts 130. In the disclosed embodiment, the partition walls 126 are connected to both the main part 121 and the linking part 123; however, partition walls may be provided to prevent interference or contact between the contact parts 132 without interconnecting the main part 121 and the linking part 123.

The connecting parts 133 are disposed in recesses 127 in the bottom surface of the main part 121 of the housing 120. Solder fillets are formed in these recesses 127 when the connecting parts 133 are soldered to the surface of a circuit board (not shown in the Figures). Furthermore, as shown in FIGS. 5–10, recesses 124 are formed in the end walls 122, and positioning posts 125 are used to position the board-mounted connector 110 when the board-mounted connector 110 is placed on the circuit board.

Preferred embodiments of board-mounted connectors of the present invention have been described above. However, these embodiments are merely examples; various modifications and alterations may be made by a person skilled in the art.

I claim:

1. A board-mountable electrical connector comprising:
a housing which holds a plurality of contacts in a row, each of the contacts including a supporting part that is fixed to the housing, a connecting part disposed at one end of the supporting part for connection with a circuit board, and a contact part disposed at an opposite end of the supporting part for electrical contact with a mating body, the contact part extending from the supporting part with successive portions including, first, a downward-facing projection adjacent to the supporting part, a projecting shape extending upward to an apex and then downward to a bent part at a forward end of the contact part, and an arm part extending upwardly and rearwardly from the bent part, wherein the arm part includes a pair of contact projections which are configured to engage the mating body, and the contact projections are disposed rearwardly of the apex of the projecting part.

2. The electrical connector of claim 1, wherein the housing includes partition walls disposed between adjacent said contacts.

3. The electrical connector of claim 1, wherein the housing includes a main part which extends parallel to the row of contacts, and which supports the supporting parts, a pair of end walls extending from the main part at respective opposite ends of the row of contacts, and a linking part which connects the pair of end walls, wherein the row of contacts are surrounded by the main part, the pair of end walls and the linking part.

* * * * *